United States Patent
Moon et al.

(10) Patent No.: US 12,019,678 B2
(45) Date of Patent: Jun. 25, 2024

(54) METHOD AND SYSTEM FOR RETRIEVING VIDEO SEGMENT BY A SEMANTIC QUERY

(71) Applicant: Electronics and Telecommunications Research Institute, Daejeon (KR)

(72) Inventors: Jin Young Moon, Daejeon (KR); Jung Kyoo Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/881,151

(22) Filed: Aug. 4, 2022

(65) Prior Publication Data
US 2023/0083476 A1 Mar. 16, 2023

(30) Foreign Application Priority Data
Aug. 30, 2021 (KR) .................. 10-2021-0115014

(51) Int. Cl.
*G06F 7/00* (2006.01)
*G06F 16/732* (2019.01)
*G06F 40/279* (2020.01)
*G06F 40/30* (2020.01)
(Continued)

(52) U.S. Cl.
CPC ........ *G06F 16/7328* (2019.01); *G06F 40/279* (2020.01); *G06F 40/30* (2020.01); *G06V 10/82* (2022.01); *G06V 20/46* (2022.01); *G06V 20/49* (2022.01)

(58) Field of Classification Search
CPC .. G06F 16/7328; G06F 40/279; G06F 16/243; G06F 16/783; G06F 40/30; G06V 10/82; G06V 20/49; G06N 3/08; G06N 3/045; H04N 21/44008
See application file for complete search history.

(56) References Cited

U.S. PATENT DOCUMENTS

| 7,860,718 | B2 | 12/2010 | Lee et al. |
| 8,666,152 | B1 * | 3/2014 | Ramanathan .......... G06V 20/46 382/168 |
| 10,839,223 | B1 * | 11/2020 | Jiang ..................... G06V 20/46 |

(Continued)

FOREIGN PATENT DOCUMENTS

| KR | 10-1903720 B1 | 9/2018 |
| KR | 10-2174658 B1 | 11/2020 |
| KR | 10-2021-0075924 A | 6/2021 |

*Primary Examiner* — Mohammed R Uddin
(74) *Attorney, Agent, or Firm* — KILE PARK REED & HOUTTEMAN PLLC (57) ABSTRACT

Provided is a method of detecting a semantics section in a video. The method includes extracting all video features by inputting an inputted video to a pre-trained first deep neural network algorithm, extracting a query sentence feature by inputting an inputted query sentence to a pre-trained second deep neural network algorithm, generating video-query relation integration feature information in which all of the video features and the query sentence feature have been integrated by inputting all of the video features and the query sentence feature to a plurality of scaled-dot product attention layers, and estimating a video segment corresponding to the query sentence in the video based on the video-query relation integration feature information.

15 Claims, 7 Drawing Sheets

(51) Int. Cl.
  *G06V 10/82*  (2022.01)
  *G06V 20/40*  (2022.01)

(56) References Cited

U.S. PATENT DOCUMENTS

| | | | |
|---|---|---|---|
| 2016/0378861 A1* | 12/2016 | Eledath | G06V 20/52 |
| | | | 707/766 |
| 2017/0150235 A1* | 5/2017 | Mei | G06N 3/044 |
| 2018/0293313 A1* | 10/2018 | Hauptmann | G06F 16/7837 |
| 2020/0356804 A1 | 11/2020 | Kim et al. | |
| 2021/0012222 A1* | 1/2021 | Kim | G06F 40/30 |
| 2021/0081673 A1* | 3/2021 | Lai | G06V 20/41 |
| 2021/0097290 A1* | 4/2021 | Yang | G06V 20/46 |
| 2021/0109966 A1* | 4/2021 | Ayush | G06N 3/044 |
| 2021/0150118 A1* | 5/2021 | Le | G06N 3/044 |
| 2021/0200803 A1* | 7/2021 | Zhang | G06F 16/7844 |
| 2021/0248375 A1* | 8/2021 | Geng | G06F 16/9035 |
| 2021/0248376 A1* | 8/2021 | Zhao | G06V 20/49 |
| 2022/0044022 A1* | 2/2022 | Gan | G06V 20/46 |
| 2022/0300740 A1* | 9/2022 | Sahu | G06F 18/214 |
| 2023/0017072 A1* | 1/2023 | Arnab | G06V 20/49 |
| 2023/0289733 A1* | 9/2023 | Stewart | G06Q 10/1053 |
| | | | 705/321 |

\* cited by examiner

METHOD AND SYSTEM FOR RETRIEVING VIDEO SEGMENT BY A SEMANTIC QUERY

CROSS-REFERENCE TO RELATED APPLICATION

This application claims priority to and the benefit of Korean Patent Application No. 10-2021-0115014, filed on Aug. 30, 2021, the disclosure of which is incorporated herein by reference in its entirety.

BACKGROUND

1. Technical Field

The present disclosure relates to a method and system for retrieving video segment by a semantic query and, particularly, to the understanding of contents inherent in a query sentence and the retrieval of a video segment matched with contents of a query sentence in a video.

2. Related Art

Conventional methods for retrieving a video segment in a video have an object of retrieving an accurate video segment by further well understanding a correlation between semantic queries having a sentence form and a video. Accordingly, in order to understand a complicated relation between a video and query information, methods of dividing a video by a time having a fixed length and interacting with a query for each timing is researched.

This has shown meaningful performance improvement in video semantics retrieval performance, but it is unreasonable to apply the video retrieval methods according to the conventional technologies to several real-world scenarios that require a real-time property and a high execution speed because the methods require lots of computing resources and a lot of the time required.

SUMMARY

Various embodiments are directed to providing a method and system for retrieving video segment by a semantic query, which can retrieve a video segment in a video by using small computing resources and time required at a high speed with accuracy through a one interaction between the entire video and a query from multiple viewpoints.

However, an object to be solved by the present disclosure is not limited to the aforementioned object, and other objects may be present.

In an embodiment, a method performed by a computer includes extracting all video features by inputting an inputted video to a pre-trained first deep neural network algorithm, extracting a query sentence feature by inputting an inputted query sentence to a pre-trained second deep neural network algorithm, generating video-query relation integration feature information in which all of the video features and the query sentence feature have been integrated by inputting all of the video features and the query sentence feature to a plurality of scaled-dot product attention layers, and estimating a video segment corresponding to the query sentence in the video based on the video-query relation integration feature information.

In an embodiment, a system for retrieving video segment by a semantic query includes a memory in which a program for detecting a semantics section corresponding to a query sentence with respect to an inputted video has been stored and a processor configured to execute the program stored in the memory. In this case, as the program is executed, the processor extracts all video features and a query sentence feature by inputting an inputted video and a query sentence to each of pre-trained first and second deep neural network algorithms, generates video-query relation integration feature information by inputting all of the video features and the query sentence feature to a plurality of scaled-dot product attention layers, and estimates a video segment corresponding to a query sentence in the video based on the video-query relation integration feature information.

A computer program according to another aspect of the present disclosure is combined with a computer, that is, hardware, executes the method of retrieving video segment by a semantic query, and is stored in a computer-readable recording medium.

Other details of the present disclosure are included in the detailed description and the drawings.

The existing video segment retrieval technologies include a coarse-grained method of associating a video and all queries at a time and a fine-grained method of newly associating queries every timing of a video. The existing coarse-grained method has a fast speed and a low computational load, but has a disadvantage in that it has low performance. The fine-grained method is great in a computational load and relatively slow, but has high performance.

In contrast, embodiments of the present disclosure have advantages in that the embodiments can provide a practical video segment retrieval method because high performance as much as the fine-grained method can be provided even though a relation between a video and queries is provided through the coarse-grained method and the embodiments can be applied to a real-world service using the practical video segment retrieval detection method.

The effects of the present disclosure are not limited to the above-mentioned effects, and other effects which are not mentioned herein will be clearly understood by those skilled in the art from the following descriptions.

DETAILED DESCRIPTION

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various elements, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Figure 1:
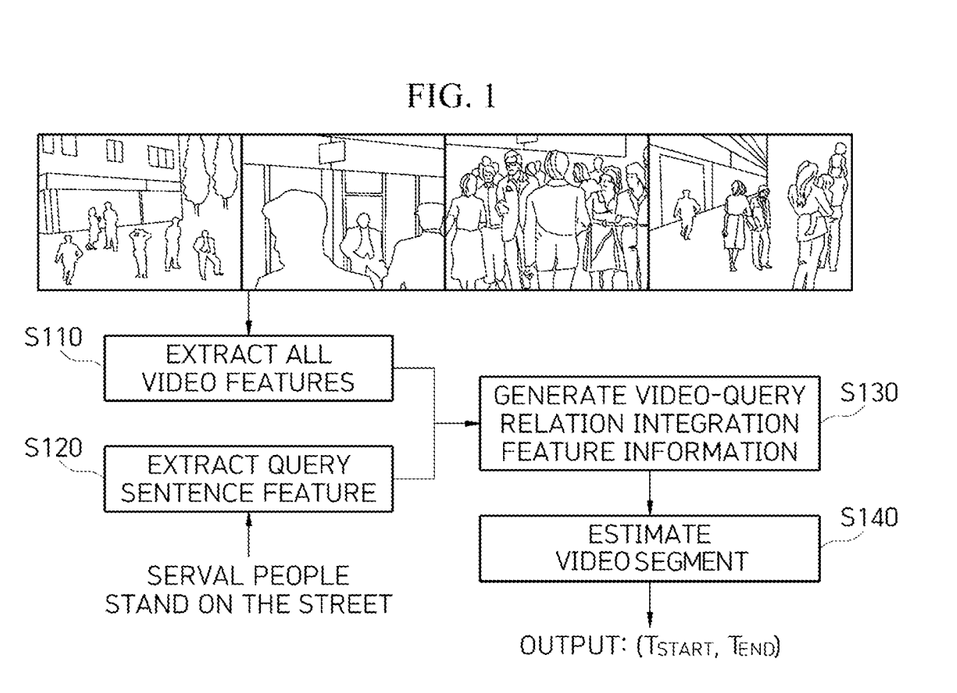
FIG. 1 is a flowchart of a method of retrieving video segment by a semantic query according to an embodiment of the present disclosure.

FIG. 1 is a flowchart of a method of retrieving video segment by a semantic query according to an embodiment of the present disclosure.

The method of retrieving video segment by a semantic query according to an embodiment of the present disclosure includes a step S110 of extracting all video features by inputting an inputted video to a pre-trained first deep neural network algorithm, a step S120 of extracting a query sentence feature by inputting an inputted query sentence to a pre-trained second deep neural network algorithm, a step S130 of generating video-query relation integration feature information in which all of the video features and the query sentence feature are integrated by inputting all of the video features and the query sentence feature to a plurality of scaled-dot product attention layers, and a step S140 of estimating a video segment corresponding to the query sentence in the video based on the video-query relation integration feature information (S140).

That is, according to an embodiment of the present disclosure, features are extracted in a vector form by applying each of two different pre-trained deep neural network algorithms to a given video input and a query sentence input. An integrated feature for the entire section in which a relation between a video and queries has been incorporated is generated based on an interaction between the entire video and a query sentence from multiple light-weighted viewpoints. Furthermore, a video segment that most represents a query within a video is inferred by predicting a one-dimensional start and end score sequence in the entire video segment that is necessary by using the integrated feature.

The steps described with reference to FIG. 1 may be understood as being performed by a system 100 for retrieving video segment by a semantic query in FIG. 7, but is not essentially limited thereto.

Figure 2:
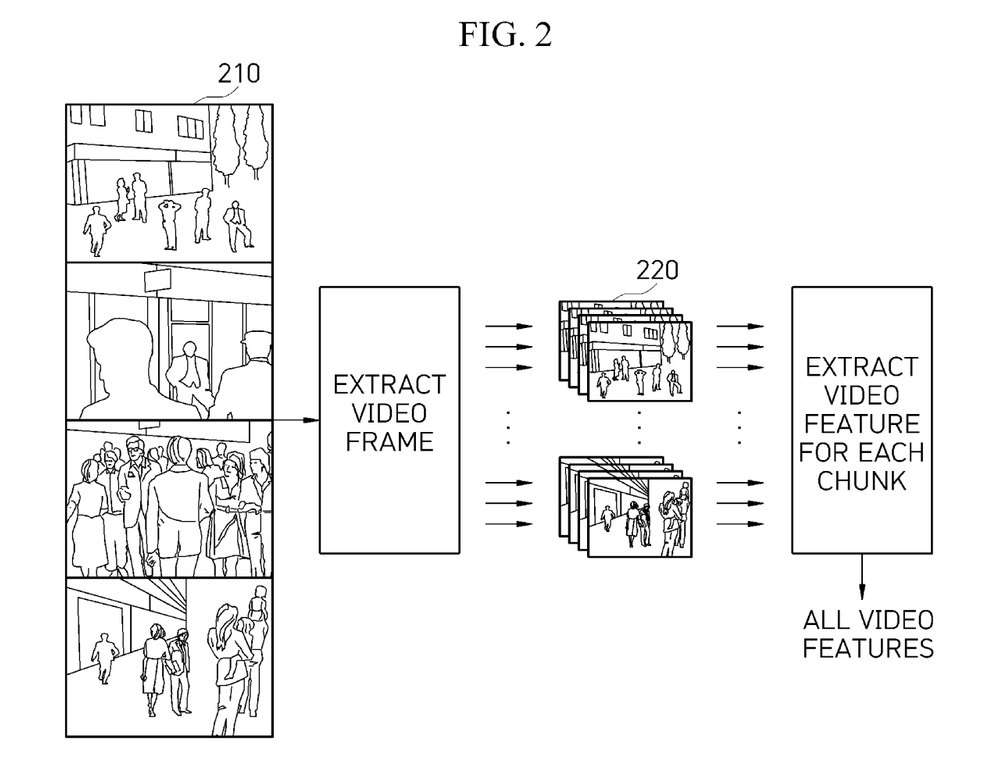
FIG. 2 is a diagram for describing a process of extracting all video features in an embodiment of the present disclosure.

FIG. 2 is a diagram for describing a process of extracting all video features in an embodiment of the present disclosure.

First, according to an embodiment of the present disclosure, all video features are extracted by inputting an inputted video 210 to the pre-trained first deep neural network algorithm (S110). In this case, in order to extract the video features, a fast behavior recognition network may be used as the first deep neural network algorithm.

In step S110, the inputted video 210 is segmented as the unit of a chunk 220, and video features for each chunk 220 are extracted in a vector form. Furthermore, all video features may be extracted by concatenating the extracted video features corresponding to "t" chunks.

For example, an RGB frame or a flow frame corresponding to each chunk 220 may be extracted from a video. All video features may be extracted by extracting and concatenating video features for each chunk 220 based on the RGB frames or the flow frames.

That is, as in FIG. 2, sequences of the inputted original video 210 may be segmented into a plurality of chunks 220 by grouping or sampling the sequences as a certain number of frames. In this case, a plurality of chunks 220 may be generated by dividing the video 210 into several pieces having a certain length.

Thereafter, after video features for each chunk are extracted in a vector form with respect to each chunk 220, all video features may be extracted by concatenating the video features for each chunk.

Figure 3:
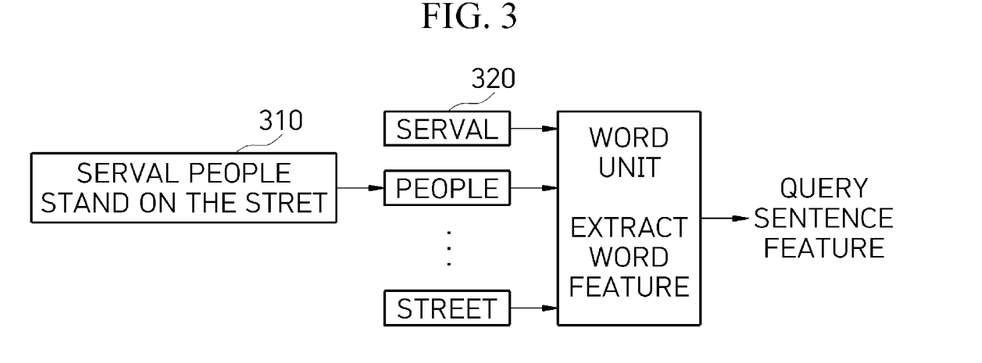
FIG. 3 is a diagram for describing a process of extracting a query sentence feature in an embodiment of the present disclosure.

Next, a query sentence feature is extracted by inputting an inputted query sentence to the pre-trained second deep neural network algorithm (S120).

FIG. 3 is a diagram for describing a process of extracting a query sentence feature in an embodiment of the present disclosure.

In step S120, in order to extract a query feature having a sentence form, frequency information of words 320 within a sentence 310 of a document, which are collected through a designated method (e.g., collection through the Internet), is extracted. A word feature having the unit of the word 320 is extracted by inputting semantics of each word within the sentence to the second deep neural network algorithm based on the frequency information. Furthermore, a query sentence feature may be extracted by concatenating the extracted m word features.

In this case, in an embodiment of the present disclosure, a Glove network that has learnt semantics of each word in advance maybe used as the second deep neural network algorithm.

For example, referring to FIG. 3, the query 310 having a natural language sentence form may be segmented into a plurality of words 320. Thereafter, a word feature having the unit of the word 320 may be extracted by inputting each word 320 to the second deep neural network algorithm. A query sentence feature may be extracted by concatenating the extracted word features.

Next, video-query relation integration feature information in which all of the video features and the query sentence feature have been integrated is generated by inputting, to a plurality of scaled-dot product attention layers, all of the video features and the query sentence feature extracted in steps S110 and S120 (S130).

Figure 4:
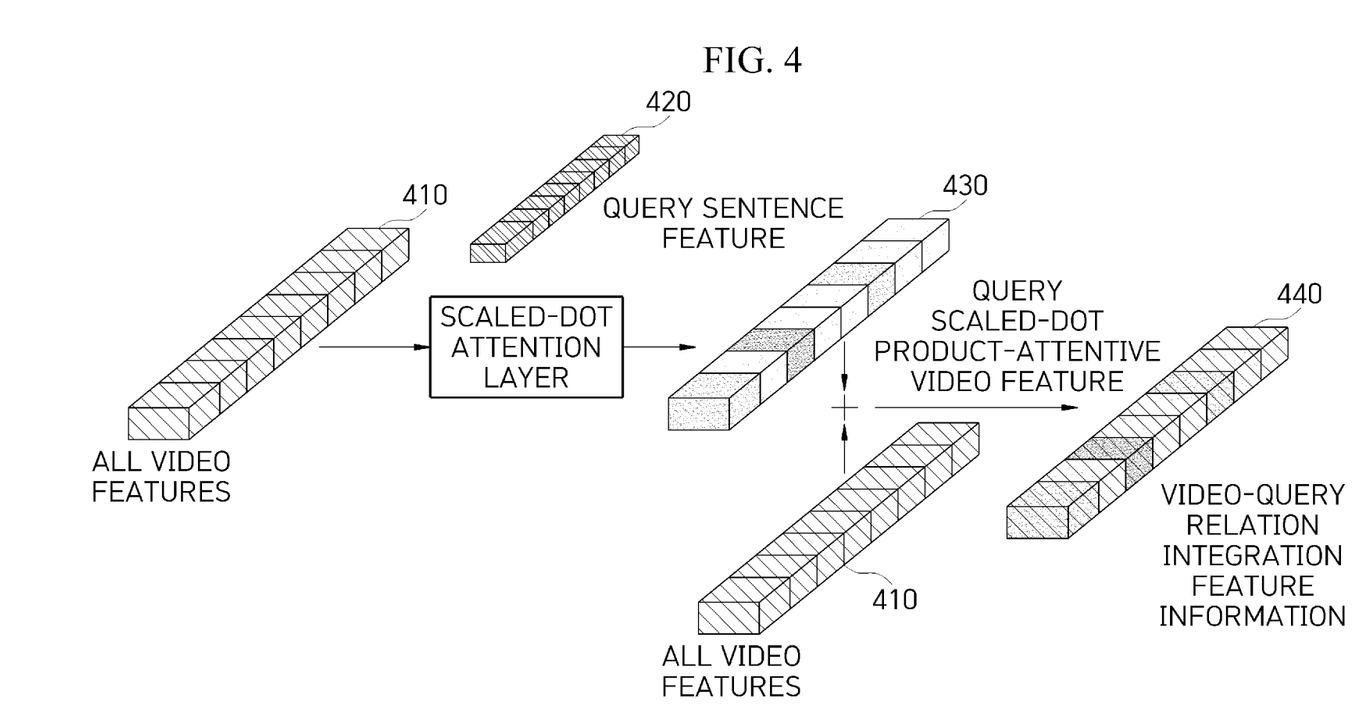
FIG. 4 is a diagram for describing a scaled-dot product attention layer.

FIG. 4 is a diagram for describing a scaled-dot product attention layer.

FIG. 4 is for describing a scaled-dot product attention layer, that is, a basis for a multi-scaled-dot product attention mechanism. The scaled-dot product attention layer differently processes different two inputs as a main input 410 and an auxiliary input 420.

According to an embodiment of the present disclosure, the scaled-dot product attention layer generates a viewpoint filter having the same size as the main input through an interaction between the main input 410 and the auxiliary input 420 by simulating that a video just watched by a person is different from information recognized by the person when viewing the video while thinking a query. Furthermore, the scaled-dot product attention layer may generate feature information 440 in which a weight has been incorporated into a portion related to the auxiliary input 420 by adding, to the original main input 410, a modified main input 430 in which a viewpoint-based attention weight has been incorporated.

That is, according to an embodiment of the present disclosure, the scaled-dot product attention layer may extract feature information of the main input information of an auxiliary input viewpoint by setting any one of all video features, a query sentence feature, and an output feature of the scaled-dot product attention layer of them as a main input and auxiliary input of a scaled-dot product attention layer.

For example, assuming that X, Y is the entire video or a query sentence and a form of a matrix is $x = \mathbb{R}^{n_x \times d}$ and $y = \mathbb{R}^{n_y \times d}$ the scaled-dot product attention may be represented as in Equation 1 below. In this case, $n_x$, $n_y$ may denote the length of an input feature, and d may denote the dimension size of each feature. This is the results of understanding of X in the viewpoint of Y.

$$Mr(X, Y) = softmax\left(\frac{(X \times W_q) \times (Y \times W_k)^T}{\sqrt{d}}\right) \quad [\text{Equation 1}]$$

$$Mr(X, Y) \in \mathbb{R}^{n_x \times n_y}$$

$$Att(X, Y) = Mr(X, Y) \times (Y \times W_v) \in \mathbb{R}^{n_x \times d}$$

In Equation 1, $W_q$, $W_k$, $W_v \in \mathbb{R}^{d \times d_{att}}$ mean a matrix that may be learnt, and a softmax operation is applied to all rows. Mr(X,Y) interacts with the two inputs X and Y through a dot-product attention. Furthermore, ATT(X,Y) means a weight that provides a guide to X so that an attention is applied to a modal at a location related to Y.

A multi-head attention includes a fixed number of independent attentions in parallel, and may be represented as in Equation 2 below.

att=Att(X,Y)

multi(X,Y)={att$_1$||att$_2$|| . . . ||att$_N$} persp(X,Y)=($W_m$=multi(X,Y)+X persp(X,Y)∈ $\mathbb{R}^{n_x \times d}$ [Equation 2]

In Equation 2, N means the number of predefined heads. || means a concatenation of two matrices. After N parallel attention results are accumulated, the attention results are made to interact with each other by multiplying a linear projection matrix $W_m \in \mathbb{R}^{d \times (n \times d)}$. Thereafter, the output of the multi-head attention is added along with a circle feature X, which is represented as persp(XY). In this case, an obtained persp(X,Y) indicates X understood from the Y viewpoint.

An interaction obtained as a single scaled-dot product attention lacks consideration for area and global information. In an embodiment of the present disclosure, as will be described later in FIG. 5, a plurality of scaled-dot product attention layers is used.

Figure 5:
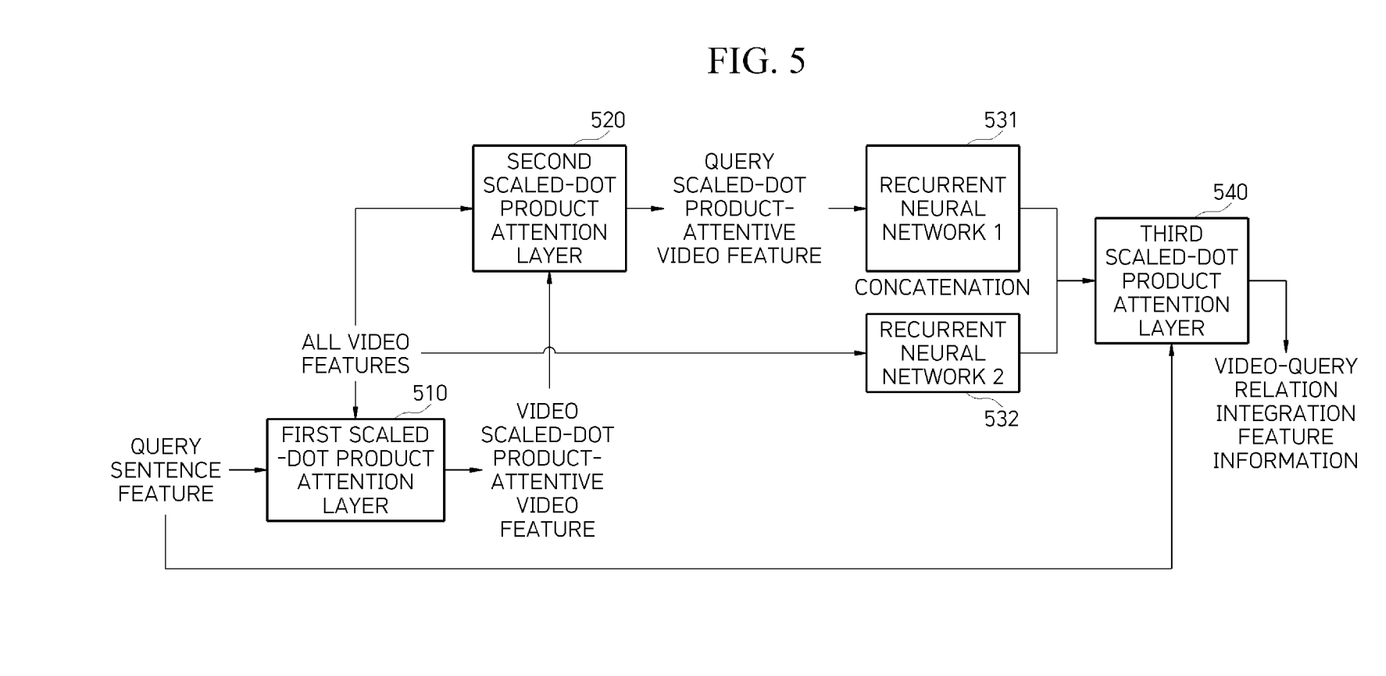
FIG. 5 is a diagram for describing a process of generating video-query relation integration feature information based on a scaled-dot product attention layer.

FIG. 5 is a diagram for describing a process of generating video-query relation integration feature information based on a scaled-dot product attention layer.

In an embodiment of the present disclosure, video-query relation integration feature information is generated based on a scaled-dot product attention layer. In order to understand a relation between a video and queries, a plurality of scaled-dot product attention layers 510, 520, and 540 is used.

The first scaled-dot product attention layer 510 sets a query sentence feature as a main input, sets all video features as an auxiliary input, and generates a video scaled-dot product-attentive query feature understood from a video viewpoint.

Next, the second scaled-dot product attention layer 520 sets all of the video features as a main input, sets, as an auxiliary input, the video scaled-dot product-attentive query feature generated through the first scaled-dot product attention layer 510, and generates a query scaled-dot product-attentive video feature understood from a query viewpoint.

Next, global information and dynamic information of the video are obtained by inputting, to two independent recurrent neural networks 531 and 532, the query scaled-dot product-attentive video feature generated through the second scaled-dot product attention layer 520 and all of the video features, respectively.

A query scaled-dot product-attentive video feature, that is, one video feature in which the global information and the dynamic information have been incorporated, is generated by concatenating all of the video features and each query scaled-dot product-attentive video feature having the global information and dynamic information of the video. In this case, local information of the video may also be obtained based on a difference between each query scaled-dot product-attentive video feature and all of the video features.

In this case, an embodiment of the present disclosure has an advantage in that it can process the entire video and all queries at a time through an interaction between the video and the queries at a very fast speed with a small computational load, compared to the existing methods of interacting with a query every timing of a video in order to obtain global information.

Specifically, in the case of a video corresponding to about 10 seconds, in the existing methods, in order to understand a local relation, association with a query has to be newly calculated each time with respect to a video having timings, such as 1 second, 2 seconds, and 3 seconds. In contrast, in an embodiment of the present disclosure, after a video corresponding to about 10 seconds is understood from two different viewpoints, local information for each timing can be calculated at a time through an interaction with the understood information. In this case, a process of calculating a relation between the video and queries can be reduced while maintaining high performance.

The query sentence feature interacted through the first scaled-dot product attention layer 510 in the previous step is a query feature that is attentive from a video viewpoint. Accordingly, the third scaled-dot product attention layer 540 sets a common query sentence feature as an auxiliary input, sets the query scaled-dot product-attentive video feature in which the global information, the local information, and the dynamic information have been incorporated as a main input, and generates video-query relation integration feature information for which query information missed while focusing on the video has been supplemented.

Figure 6:
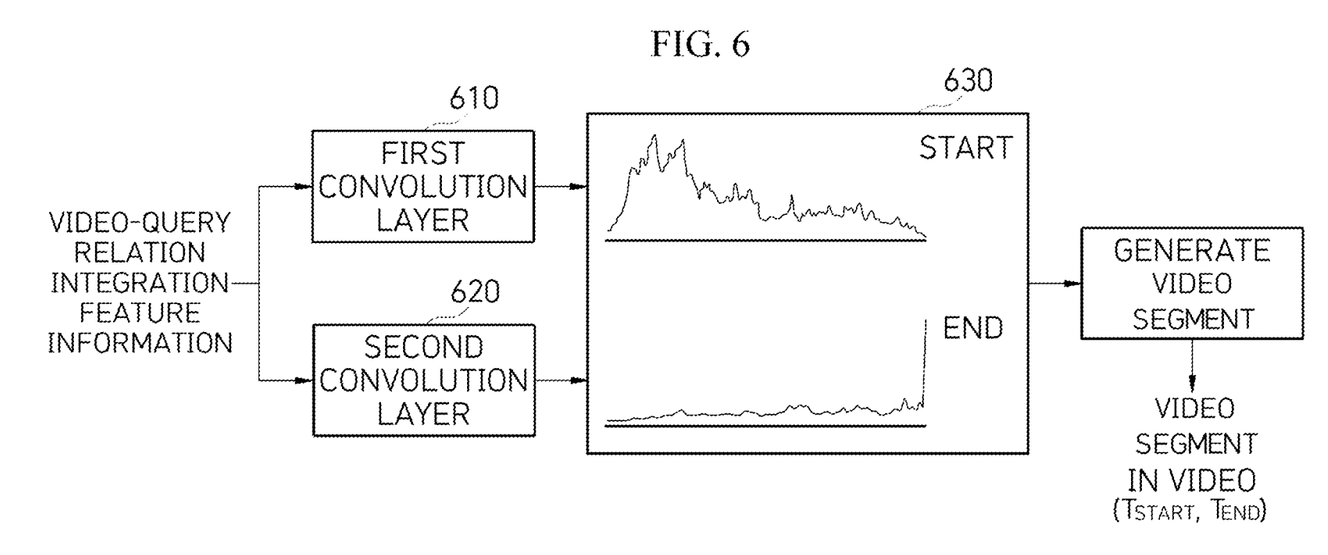
FIG. 6 is a diagram for describing a process of estimating a video segment in an embodiment of the present disclosure.

Next, a video segment corresponding to the query sentence in the video is estimated based on the video-query relation integration feature information (S140).

FIG. 6 is a diagram for describing a process of estimating a video segment in an embodiment of the present disclosure.

In step S140, a video segment matched with a query is estimated every timing of the video by inputting, to each of a plurality of convolution layers 610 and 620, the video-query relation integration feature information generated in the previous step.

Specifically, the first convolution layer 610 calculates a start score sequence, that is, a probability value of a start point of an optimal video segment having corresponding timing matched with a query every timing of the video.

Furthermore, the second convolution layer 620 calculates an end score sequence, that is, a probability value of an end point of an optimal video segment having corresponding timing matched with the query every timing of the video.

For reference, the start and the end in FIG. 6 mean the start score sequence and the end score sequence 630, respectively. A video segment may be estimated based on the start and end score sequences.

The simplest embodiment in which a video segment is estimated is to estimate, as a video segment, each maximum value that satisfies a condition in which the probability value in the start score sequence that precedes the probability value in the end score sequence. That is, $(T_{Start}, T_{End})$ in which $T_{Start}$ precedes $T_{End}$ among maximum values of score sequences is returned as a video segment.

An embodiment of the present disclosure has an advantage in that it can predict more accurate start and end timing based on a boundary score because a video segment does not need to be previously defined, compared to the existing method of calculating a reliability probability with respect to video segment predefined for a video.

In the aforementioned description, steps S110 to S140 may be further divided into additional steps or may be combined as smaller steps depending on an implementation example of the present disclosure. Furthermore, some steps may be omitted if necessary, and the sequence of steps may be changed. The method of detecting a semantics section in a video, which has been described with reference to FIGS. 1 to 6, may also be applied to contents described with reference to FIG. 7.

Hereinafter, a system 100 for retrieving video segment by a semantic query according to an embodiment of the present disclosure is described with reference to FIG. 7.

Figure 7:
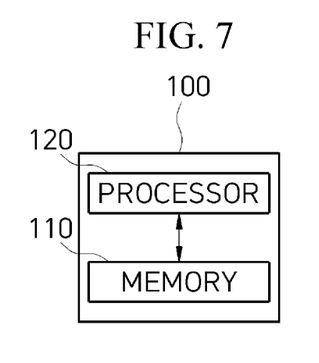
FIG. 7 is a block diagram of a system for retrieving video segment by a semantic query according to an embodiment of the present disclosure.

FIG. 7 is a block diagram of the system 100 for retrieving video segment by a semantic query according to an embodiment of the present disclosure.

The system 100 for retrieving video segment by a semantic query according to an embodiment of the present disclosure is constructed to include a memory 110 and a processor 120.

The memory 110 stores a program for estimating a video segment corresponding to a query sentence in an inputted video with respect to the video and the query sentence. The processor 120 executes the program stored in the memory 110.

The processor 120 extracts all video features and a query sentence feature by inputting the inputted video and the query sentence to each of the pre-trained first and second deep neural network algorithm. Furthermore, the processor 120 generates video-query relation integration feature information by inputting all of the video features and the query sentence feature to a plurality of scaled-dot product attention layers, and estimates a video segment corresponding to the query sentence in the video based on the video-query relation integration feature information.

The method of retrieving video segment by a semantic query according to an embodiment of the present disclosure may be implemented as a program (or application) and stored in a medium in order to be combined with a computer, that is, hardware, and executed.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method performed by a computer, comprising:
   extracting all video features by inputting an inputted video to a pre-trained first deep neural network algorithm;
   extracting a query sentence feature by inputting an inputted query sentence to a pre-trained second deep neural network algorithm;
   generating video-query relation integration feature information in which all of the video features and the query sentence feature have been integrated by inputting all of the video features and the query sentence feature to a plurality of scaled-dot product attention layers; and
   estimating a video segment corresponding to the query sentence in the video based on the video-query relation integration feature information,
   wherein the generating of the video-query relation integration feature information comprises:
   setting, as a main input and auxiliary input of the scaled-dot product attention layer, any one of all of the video features, the query sentence feature, and an output feature of the scaled-dot product attention layer of the all of the video features and the query sentence feature,
   extracting feature information for main input information from an auxiliary input viewpoint,
   generating a viewpoint filter through the scaled-dot product attention layer, having the same size as the main input through an interaction between the main input and the auxiliary input, and
   generating feature information in which a weight has been incorporated into a portion related to the auxiliary input by adding, to the original main input, a modified main input in which a viewpoint-based attention weight has been incorporated.

2. The method of claim 1, wherein the extracting of all the video features by inputting the inputted video to the pre-trained first deep neural network algorithm comprises:
   segmenting the inputted video as a unit of a chunk and extracting, for each chunk, video features for each chunk extracted in a vector form; and
   extracting all of the video features by concatenating the video features for each chunk.

3. The method of claim 1, wherein the extracting of the query sentence feature by inputting the inputted query sentence to the pre-trained second deep neural network algorithm comprises:
   extracting frequency information of words within a sentence of a document collected through a designated method;
   extracting a word feature for each word unit by inputting semantics of each word within the sentence to the second deep neural network algorithm based on the frequency information; and
   extracting the query sentence feature by concatenating the extracted word features.

4. The method of claim 1, wherein the generating of the video-query relation integration feature information comprises:
   setting the query sentence feature as a main input of a first scaled-dot product attention layer, setting all of the video features as an auxiliary input of the first scaled-dot product attention layer, and generating a video scaled-dot product-attentive query feature;
   setting all of the video features as a main input of a second scaled-dot product attention layer, setting the video scaled-dot product-attentive query feature as an auxiliary input of the second scaled-dot product attention layer, and generating a query scaled-dot product-attentive video feature; and
   setting the query scaled-dot product-attentive video feature as a main input of a third scaled-dot product attention layer, setting the query sentence feature as an auxiliary input of the third scaled-dot product attention layer, and generating the video-query relation integration feature information.

5. The method of claim 4, further comprising generating a query scaled-dot product-attentive video feature in which global information, dynamic information, and local information of the video have been incorporated by inputting the query scaled-dot product-attentive video feature and all of the video features to each of recurrent neural networks and concatenating the query scaled-dot product-attentive video feature and all of the video features,
   wherein the generating of the video-query relation integration feature comprises setting the query scaled-dot product-attentive video feature in which the global information, the dynamic information, and the local information have been incorporated as the main input of the third scaled-dot product attention layer, setting the query sentence feature as the auxiliary input of the third scaled-dot product attention layer, and generating the video-query relation integration feature information.

6. The method of claim 1, wherein the estimating of the video segment corresponding to the query sentence in the video based on the video-query relation integration feature information comprises estimating a video segment matched with a query every timing of the video by inputting the video-query relation integration feature information to each of a plurality of convolution layers.

7. The method of claim 6, wherein the estimating of the video segment corresponding to the query sentence in the video based on the video-query relation integration feature information comprises:
   calculating a start score sequence which is a probability value of a start point matched with a query every timing of the video through a first convolution layer;
   calculating an end score sequence which is a probability value of an end point matched with the query every timing of the video through a second convolution layer; and
   estimating the video segment based on the start score sequence and the end score sequence.

8. The method of claim 7, wherein the estimating of the video segment based on the start score sequence and the end score sequence comprises estimating, as the video segment, each maximum value satisfying a condition in which the probability value in the start score sequence antecedes the probability value in the end score sequence.

9. A system for retrieving video segment by a semantic query, the system comprising:
   a memory in which a program for detecting a semantics section corresponding to a query sentence with respect to an inputted video has been stored; and
   a processor configured to execute the program stored in the memory,
   wherein the processor is configured to, as the program is executed,
   extract all video features and a query sentence feature by inputting an inputted video and a query sentence to each of pre-trained first and second deep neural network algorithms, generate video-query relation integration feature information by inputting all of the video features and the query sentence feature to a plurality of scaled-dot product attention layers, and estimate a video segment corresponding to a query sentence in the video based on the video-query relation integration feature information, wherein the processor sets, as a main input and auxiliary input of the scaled-dot product attention layer, any one of all of the video features, the query sentence feature, and an output feature of the scaled-dot product attention layer of the all of the features and the query sentence feature, extracts feature information for main input information from an auxiliary input viewpoint, generates a viewpoint filter through the scaled-dot product attention lase having the same size as the main input through an interaction between the main in input and the auxiliary input, and generates feature information in which a weight has been incorporated into a portion related to the auxiliary input by adding, to the original main input, a modified main input in which a viewpoint-based attention weight has been incorporated.

10. The system of claim 9, wherein the processor segments the inputted video as a unit of a chunk and extracting, for each chunk, video features for each chunk extracted in a vector form, and extracts all of the video features by concatenating the video features for each chunk.

11. The system of claim 9, wherein the processor extracts frequency information of words within a sentence of a document collected through a designated method, extracts a word feature for each word unit by inputting semantics of each word within the sentence to the second deep neural network algorithm based on the frequency information, and extracts the query sentence feature by concatenating the extracted word features.

12. The system of claim 9, wherein the processor sets the query sentence feature as a main input of a first scaled-dot product attention layer, sets all of the video features as an auxiliary input of the first scaled-dot product attention layer, and generates a video scaled-dot product-attentive query feature, sets all of the video features as a main input of a second scaled-dot product attention layer, sets the video scaled-dot product-attentive query feature as an auxiliary input of the second scaled-dot product attention layer, and generates a query scaled-dot product-attentive video feature, and sets the query scaled-dot product-attentive video feature as a main input of a third scaled-dot product attention layer, sets the query sentence feature as an auxiliary input of the third scaled-dot product attention layer, and generates the video-query relation integration feature information.

13. The system of claim 12, wherein the processor generates a query scaled-dot product-attentive video feature in which global information, dynamic information, and local information of the video have been incorporated by inputting the query scaled-dot product-attentive video feature and all of the video features to each of recurrent neural networks and concatenating the query scaled-dot product-attentive video feature and all of the video features, and sets the query scaled-dot product-attentive video feature in which the global information, the dynamic information, and the local information have been incorporated as the main input of the third scaled-dot product attention layer, sets the query sentence feature as the auxiliary input of the third scaled-dot product attention layer, and generates the video-query relation integration feature information.

14. The system of claim 9, wherein the processor calculates a start score sequence which is a probability value of a start point matched with a query every timing of the video by inputting the video-query relation integration feature information to a first convolution layer, calculates an end score sequence which is a probability value of an end point matched with the query every timing of the video by inputting the video-query relation integration feature information to a second convolution layer, and estimates the video segment based on the start score sequence and the end score sequence.

15. The system of claim 14, wherein the processor estimates, as the video segment, each maximum value satisfying a condition in which the probability value in the start score sequence antecedes the probability value in the end score sequence.

* * * * *